United States Patent
Chesnokov (10) Patent No.: US 10,783,620 B2
(45) Date of Patent: Sep. 22, 2020

(54) IMAGE PROCESSING

(71) Applicant: Apical Ltd, Cambridge (GB)

(72) Inventor: Viacheslav Chesnokov, Loughborough (GB)

(73) Assignee: Apical Limited, Cambridge (GB)

(*) Notice: Subject to any disclaimer, the term of this patent is extended or adjusted under 35 U.S.C. 154(b) by 261 days.

(21) Appl. No.: 15/834,949

(22) Filed: Dec. 7, 2017

(65) Prior Publication Data
US 2018/0182081 A1   Jun. 28, 2018

(30) Foreign Application Priority Data
Dec. 22, 2016 (GB) .................................. 1622035.2

(51) Int. Cl.
*G06T 5/00* (2006.01)
*G06T 5/50* (2006.01)

(52) U.S. Cl.
CPC ............... *G06T 5/009* (2013.01); *G06T 5/50* (2013.01); *G06T 2207/10024* (2013.01); *G06T 2207/20208* (2013.01)

(58) Field of Classification Search
CPC . G06T 5/009; G06T 5/50; G06T 2207/10024; G06T 2207/20208; G06T 7/90; G06T 5/007; H04N 5/52
See application file for complete search history.

(56) References Cited

U.S. PATENT DOCUMENTS

| | | | | |
|---|---|---|---|---|
| 6,757,442 B1* | 6/2004 | Avinash | .................. | G06T 5/004 382/168 |
| 10,360,666 B2* | 7/2019 | Lasserre | .................. | G06T 5/009 |
| 2015/0325019 A1* | 11/2015 | Sukeno | .................. | G09G 5/00 345/634 |
| 2015/0348246 A1* | 12/2015 | Lim | .................. | G06T 5/003 382/167 |
| 2016/0132999 A1* | 5/2016 | Kwon | .................. | G06T 5/008 345/593 |
| 2017/0034523 A1* | 2/2017 | Ebrahimi | .................. | H04N 21/23476 |
| 2018/0096467 A1* | 4/2018 | Chesnokov | .................. | G06T 5/009 |
| 2018/0174526 A1* | 6/2018 | Chesnokov | .................. | G06K 9/4652 |
| 2018/0232867 A1* | 8/2018 | Park | .................. | G06T 5/50 |

FOREIGN PATENT DOCUMENTS

EP   2898474 A1   7/2015

OTHER PUBLICATIONS

Combined Search and Examination Report dated Jun. 22, 2017 for Application No. GB1622035.2.

\* cited by examiner

*Primary Examiner* — Bobbak Safaipour
(74) *Attorney, Agent, or Firm* — EIP US LLP (57) ABSTRACT

A method is provided. The method includes receiving image data representing an image. The image data includes first image data representing a first version of the image. The image data includes second image data representing a second version of the image. The method includes generating gain-related data based on the first image data and the second image data. The method includes generating effective gain-related data at least based on the gain-related data and a gain-related control parameter. The method includes applying the effective gain-related data to the image data to generate output image data representing an output version of the image. A computing device is also provided.

21 Claims, 3 Drawing Sheets

IMAGE PROCESSING

CROSS-REFERENCE TO RELATED APPLICATIONS

This application claims priority to British Application No. GB 1622035.2, filed Dec. 22, 2016. The entire contents of the above-referenced patent application are hereby incorporated by reference.

TECHNICAL FIELD

The present disclosure relates to a method and a computing device for processing an image.

BACKGROUND

High dynamic range (HDR), high precision image and video content is now widely available. For example, digital cameras providing 12- or 14-bit HDR images are available. While some devices, such as HDR televisions, have HDR-compatible displays, other devices, such as smartphones, typically have low dynamic range (LDR) 8-bit displays, sometimes referred to as SDR or standard dynamic range. The extra precision of HDR content is therefore currently not visible to users of devices without HDR-compatible displays, even if they attempt to view HDR content.

For example, images may be displayed on such devices in a JPEG (Joint Photographic Experts Group, ISO/IEC 10918) format, which does not provide HDR content. The JPEG committee is, however, in the process of developing a new coding standard called JPEG XT (ISO/IEC 18477). JPEG XT aims to provide both HDR image coding and backwards compatibility with standard JPEG compression.

Standard JPEGs typically use an 8-bit precision. It is anticipated that JPEG XT images will use a higher bit precision of, for example, between 9 and 16 bits. At present, the JPEG XT format is not widely used because the differences between JPEG and JPEG XT images cannot readily be seen on current LDR 8-bit displays.

It is desirable to enhance an image quality of an image for display on LDR displays as well as HDR displays.

SUMMARY

According to some embodiments, a method is provided. The method includes receiving image data representing an image. The image data includes first image data representing a first version of the image. The image data includes second image data representing a second version of the image. The method includes generating gain-related data based on the first image data and the second image data. The method includes generating effective gain-related data at least based on the gain-related data and a gain-related control parameter. The method includes applying the effective gain-related data to the image data to generate output image data representing an output version of the image.

According to some other embodiments, a computing device is provided. The computing device includes storage for storing image data representing an image. The image data includes first image data representing a first version of the image. The image data includes second image data representing a second version of the image. The computing device includes at least one processor communicatively coupled to the storage. The computing device includes a gain-related data generation module operable to generate gain-related data based on the first image data and the second image data. The gain-related data generation module operable to generate effective gain-related data at least based on the gain-related data and a gain-related control parameter. The computing device includes an output image data generation module operable to apply the effective gain-related data to the image data to generate output image data representing an output version of the image.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Details of the method according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method that includes receiving image data representing an image. The image may be the entire or whole image or a portion, part or subset of a larger image. The image is for example an image from a web page accessed by a web browser of the computing device, such as a web browser of a smartphone; an image captured by an image capture device, such as a camera, of the computing device; or an image downloaded to or stored in storage of the computing device. The image may include any graphical or visual content, for example text, graphics, pictures, and/or photographs. The image may be a still image or a moving image. For example, the image data may be video image data.

The image data includes first image data representing a first version of the image and second image data representing a second version of the image. The first version of the image may have been processed, for example to alter the dynamic range globally or locally, to obtain the second version of the image.

Gain-related data is generated based on the first image data and the second image data. The gain-related data for example represents a gain map based on a ratio between pixel intensity values of the second version of the image and corresponding pixel intensity values of the first version of the image.

Effective gain-related data is generated at least based on the gain-related data and a gain-related control parameter and the effective gain-related data is applied to the image data to generate output image data representing an output version for the image. The gain-related control parameter for example allows characteristics of the output version of the image to be controlled, based on the gain-related data. This may therefore provide for user interactivity as the user can control the appearance of the output version of the image by controlling the gain-related control parameter. Flexibility is therefore provided for the user. In particular, the user can control how the image is displayed for example based on their own preferences, the display device used for displaying the image, or viewing conditions, such as ambient light conditions. Thus, the user can enhance the image quality for display on an HDR display, while still being able to view a suitable version of the image on an SDR display, for example by changing or selecting the gain-related control parameter appropriately.

To put the method into context, an example system with which the method may be used will be described with reference to FIG. 1. As the skilled person will appreciate, however, other systems or apparatus may be used with or to implement the method according to examples described herein. FIG. 2 illustrates a sequence diagram showing an example of communications between the one or more databases, the server device, the computing device and the display device of FIG. 1. Further details of the method according to examples are given subsequently, especially with reference to FIGS. 3 and 4.

Figure 1:
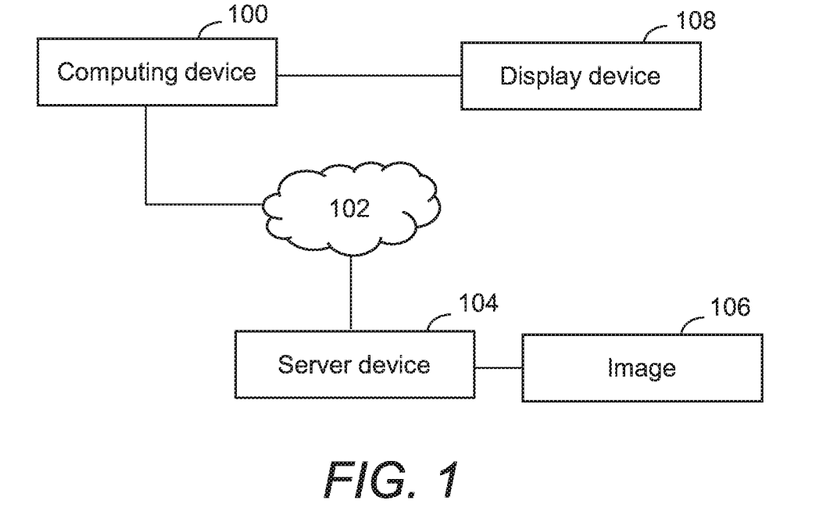
FIG. 1 is a schematic diagram showing an illustrative overview of an example system for use with a method of processing an image according to examples.
Figure 2:
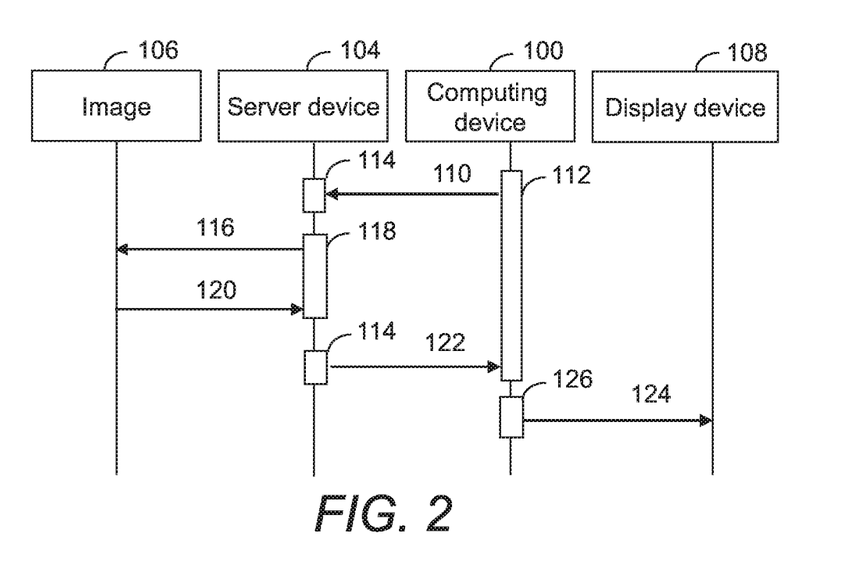
FIG. 2 is a sequence diagram showing an example of communications between the one or more databases, the server device, the computing device and the display device of FIG. 1.

FIG. 1 shows a computing device 100 communicatively coupled to a server device 104 over a network 102. An image 106 is stored on the server device 104. The computing device 100 is communicatively coupled to a display device 108. The network 102 may include a series of networks such as the Internet.

The computing device 100 may be or include, amongst others, a cell phone, i.e. a mobile phone, for example a smartphone, a tablet, laptop or personal computer, a personal digital assistant, as well as various other electronic devices such as a game console. The components of the example computing device 100 are described in detail below with reference to FIG. 5. The computing device 100 may have integrated or externally-coupled wired and/or wireless local area network (LAN) capabilities, e.g. which may be coupled via an additional Universal Serial Bus (USB) or proprietary device. For example, the computing device 100 may be couplable to a wired and/or wireless router that is in turn connected to a Digital Subscriber Line (DSL), cable or fibre connection to a local exchange. The local exchange may be coupled to the so-called Internet using one or more intermediate networks, such as a Public Switched Telephone Network (PSTN) or a cable provider's network system. Alternatively, wireless telecommunications systems such as those using the Universal Mobile Telecommunications System (UMTS) or any of the Long Term Evolution (LTE) standards may provide a communications medium for fixed or mobile computing devices. These latter network systems may in turn be connected to a series of one or more networks comprising servers, routers and other networking equipment that communicate using protocols such as Transmission Control Protocol (TCP) and Internet Protocol (IP). If the computing device 100 is a mobile device such as a smartphone, the computing device 100 may have an integrated telecommunications module for wirelessly communicating with a core network coupled to one or more TCP/IP networks; likewise, if the computing device 100 is a laptop or tablet computer it may have an externally-coupled telecommunications modem (a so-called "dongle", typically coupled via USB) for wireless communication with the core network and the wider Internet. The server device 104 may likewise have appropriate network communication components. The server device 104 may include a Hypertext Transfer Protocol (HTTP) server that is arranged to receive requests over the network 102. In certain cases, one or more of the computing device 100 and the server device 104 may include virtual devices implemented on underlying physical computing hardware. The computing device 100 in examples may be considered to be a client device configured with access to the server device 104.

In an illustrative example of a possible use of the method according to examples, a user accesses a web page using a web browser of the computing device 100. The web page is hosted on the server device 104 and includes various content including an image 106. The browser retrieves image data representing the image 106 from the server device 104 via the network 102. For example, the server device 104 may be arranged to receive and handle HTTP or other network requests. The image data may be decoded image data, which has been decoded via a standard JPEG or JPEG XT decoding process. In addition to representing the image, the image data may include additional data, such as metadata for example relating to or encoding a date and time associated with the image, a description of the image or copyright information relating to the image. For example, where the image data is in the form of a JPEG, the metadata may be stored in the Exchangeable Image File Format (EXIF). The EXIF data may be embedded within the image file itself, for example within the JPEG file. Typically, EXIF data is stored in a header of the JPEG. For example, EXIF data may be stored in one of the utility Application Segments of the JPEG, generally the APP1 (segment marker 0xFFE1), although other segments may be used. The image data includes first image data and second image data representing first and second versions of the image.

In the example of FIG. 1, the computing device 100 includes a gain-related data generation module and an output image data generation module, which together can implement the method according to examples. The computing device 100 in this example further includes a decoder module that can decode encoded image data. These modules will be described in detail with reference to FIGS. 3 to 5. Output image data representing an output version of the image may be generated using these modules, by applying effective gain-related data to the image data, which may be decoded before the gain-related data is applied. As noted above, the effective-gain related data is at least based on gain-related data based on the first image data and the second image data.

The output version of the image may be displayed by the display device 108 coupled to the computing device 100. The display device 108 may be internally coupled to the computing device, with the display device 108 forming part of the computing device 100 itself. For example, the display device 108 may be a display screen of a computing device 100 such as a smartphone; tablet, laptop or desktop computer; or personal digital assistant. Alternatively, the display device 108 may be an external device coupled to the computing device 100, for example a television screen or a computer monitor coupled to a laptop, desktop computer or game console via a High-Definition Multimedia Interface (HDMI) cable.

FIG. 2 is a sequence diagram showing an example set of communications between the storage of the server device storing the image 106, the server device 104, the computing device 100 and the display device 108 of FIG. 1.

In operation 110, a browser of the computing device 100 requests a web page including an image from the server device 104 via a network interface 112 of the computing device 100. The request is received by a network interface 114 of the server device 104. In operation 116 of the example communications of FIG. 2, a storage interface 118 of the server device 104 accesses the image data representing the image of the web page from storage of or coupled to the server device 104, which in this example is encoded image data. The web page, including the encoded image data, is transmitted from the storage to the storage interface 118 of the server device 104 in operation 120. The server device 104 then transmits the encoded image data from the network interface 114 of the server device 104 to the network interface 112 of the computing device 100 in block 122. Modules of the computing device, described further with reference to FIGS. 3 to 5, process the encoded image data to generate the output image data representing the output version of the image. In block 124, the output image data is transferred by a display device interface 126 of the computing device 100 to a display device 108 to display the output version of the image, as well as other content of the web page, to the user.

Figure 3:
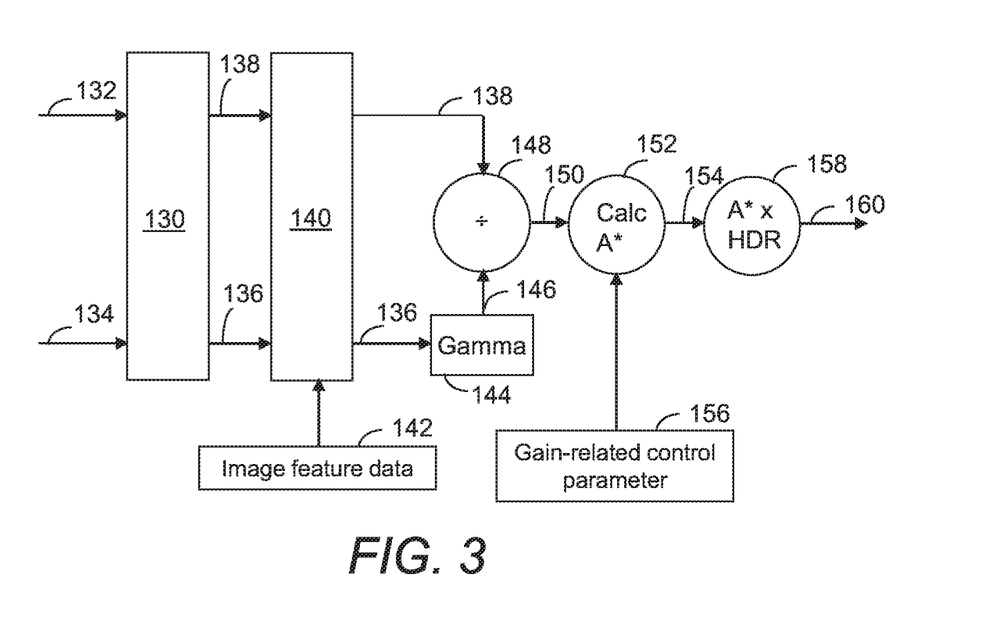
FIG. 3 is a schematic diagram illustrating the method according to examples.

FIG. 3 illustrates schematically an example of a system for carrying out the method according to examples. In FIG. 3, image data representing an image is received by a decoder 130. In this example, the image data is encoded image data. The encoded image data may be in any suitable encoded or compressed format for representing images. Common formats include the JPEG (Joint Photographic Experts Group, ISO/IEC 10918) format, which is typically an 8-bit format, or the JPEG XT (ISO/IEC 18477) format, which is typically a more than 8-bit format.

In this example, the encoded image data is in the JPEG XT format. The encoded image data includes base image layer data 132, which may be LDR or SDR data accessible to legacy implementations so that the JPEG XT file can be decoded using a standard JPEG decoder. In this example, the base image layer data 132 represents a second version of the image, which is an SDR version. The encoded image data also includes extension image layer data 134, which includes residual image data and transformation information for reconstructing an HDR image, for example an image with a higher dynamic range than the image represented by the base image layer data 132. Both the base image layer data 132 and the extension image layer data 134 may be decoded using the decoder 130. The extension image layer data 134 may then be processed with the base image layer data 132 in accordance with the JPEG XT standard to generate a first version of the image, which in this example is an HDR version of the image. This generation of the first version of the image may also be performed by the decoder 130 or by a further component or components of a computing system.

In this way, the decoder 130 is arranged to decode the encoded image data to generate decoded image data including first decoded image data 136 corresponding with the first version of the image, which is an HDR version, and second decoded image data 138 corresponding with the second version of the image, which is an SDR version in this example. By receiving the image data as encoded image data, the storage requirements for storing the encoded image data, for example on a server hosting the web page including the image, may be reduced. Additionally, the encoded image data may be transferred more rapidly from the server to the system of FIG. 3.

In the example of FIG. 3, the first decoded image data 136 and the second decoded image data 138 are then processed by further components of the system. In other examples, however, the method may involve receiving first image data representing a first version of the image and second image data representing a second version of the image that has already been previously decoded or that was not encoded. In such cases, the decoder may be absent. For brevity, and to clarify that the remainder of the system of FIG. 3 may be used for first and second image data that either has or hasn't been decoded, the first decoded image data 136 and the second decoded image data 138 of FIG. 3 will henceforth be referred to as first image data 136 and second image data 138.

As noted above, in FIG. 3, the first version is a high dynamic range (HDR) version of the image and the second version is a standard dynamic range (SDR) version of the image. In other words, the first version may have a higher dynamic range than the first version. The first image data 136 may have a precision of more than 8-bits or more 8-bits per colour channel. For example, the first image data 136 may be floating point data, for example stored in a floating point representation with a higher available bit precision than 8-bits or than the second image data 138. In other examples, the first image data 136 may have a fixed or constant bit precision, for example a fixed value of any one of 9 to 16. The second image data 138 may have an 8-bit precision or a precision of 8-bits per colour channel.

The first image data 136 and the second image data 138 may include the intensity values of each pixel of the image for the respective version of the image, which may be stored with a greyscale or brightness level of, for example, from 0 to 255 per colour band or colour channel for 8-bit data such as JPEG data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The first image data 136 and the second image data 138 may also include colour data, relating to the colour of the image represented by the respective image data. For example, when the image is a colour image, a pixel value of an intensity or brightness or each pixel may be stored separately for each colour channel for each different version of the image. If a pixel is represented by, for example, three primary colours such as in the RGB (red, green, blue) or YUV colour spaces (where Y represents the luma of the colour, U represents the difference between the blue component of the colour and the luma and V represents the difference between the red component of the colour and the luma), the visual appearance of each pixel may be represented by three intensity values, one for each primary colour. As will be appreciated by the skilled person, the first image data 136 and the second image data 138 may represent the image using any suitable representation, which may be different from the examples set out above, which are merely illustrative.

In the example of FIG. 3, the first image data 136 and the second image data 138 are input to a decision module 140. The decision module 140 also receives image feature data 142 representative of one or more features of the image. The image feature data 142 may correspond with at least one flag, with the value of each flag indicating various properties or characteristics of the image. As an example, each flag may be considered to correspond to an image quality flag, although other flags are possible.

The one or more features may include a feature indicative of a characteristic of image processing that has been applied to the first image data to obtain the second image data. For example, prior to encoding and decoding, first image data representing the first version of the image may have been processed to obtain or generate the second image data, which may subsequently have been encoded and then decoded. As will be described further below in relation to FIG. 4, the image processing may be a spatially-variant tone mapping operation that has been applied to the first image data to obtain the second image data. In such an example, the image feature data 142 may be representative of a feature indicative that the image processing, such as the spatially-variant tone mapping operation, is of a predetermined quality. For example, the image processing applied to the first image data may be of a relatively low quality. In this case, the second image data may be unreliable or suffer from errors or noise. If this is case, it may be undesirable to continue to process the first and second image data as illustrated in FIG. 3. If, however, the image processing is of a relatively high quality, the remainder of the steps of FIG. 3 may be carried out. In this way, the performing the generating the gain-related data, the generating the effective gain-related data and the applying the effective-gain related data, as will be described below, may be performed in dependence on the image feature data 142.

In other examples, the one or more features represented by the image feature data 142 may include a feature indicative that the second version of the image includes a level of noise above a predetermined noise threshold. For example, if the second image data representing the second version of the image suffers from noise, such as compression noise due to the encoding process (if the second image data has been encoded and subsequently decoded) or sensor noise from the initial capture of the image, the decision module 140 may return a decision not to continue with the remainder of the steps of the method. Conversely, if the second image data is relatively high quality, and is for example sufficiently high quality that it would be suitable for display despite being an SDR image, the decision module 140 may return a decision to perform the rest of the steps of the method.

The image feature data 142 may be metadata of the image data. For example, the image feature data 142 may be stored in a header portion of the image data, such as the EXIF portion of JPEG or JPEG XT format data. In this way, the image feature data 142 may accompany the image data during transfer of the image data, for example from a server. The image feature data 142 may therefore be hardcoded or predetermined, for example by a content creator who created the image. For example, there may be a flag indicating that a perceptual quantizer (PQ) has been applied to the image data by the content creator. As a PQ typically provides a relatively artificial-looking and flat image, as perceived by a viewer, if this flag indicates that PQ has been applied, the decision module 140 may return a decision not to perform the remainder of the steps of the method.

In other examples, the image feature data 142 may be derived from the image data itself. For example, the image data may be analysed to set the values of the flags represented by the image feature data 142 appropriately. For example, a comparison of the first image data and the second image data may be performed to assess the nature of the processing applied to the first image data to obtain the second image data (if any). For example, histograms of various characteristics of the first and second image data, such as brightness or luminance, may be obtained and compared. If, based on this comparison, it is ascertained that the first and second image data are relatively similar, for example with a similarity above a similarity threshold, the decision module 140 may return a decision not to continue with the method as it may not be possible to significantly alter the image as displayed, even by varying the gain-related control parameter. Conversely, if the similarity is beneath a similarity threshold, such as predetermined value of an absolute difference between these histograms for the first and second image data, the decision module 140 may return a decision to proceed with the method. The decision may also or additionally be based on further features of the first and second image data. For example, an analysis of features or characteristics of the second image data may be performed to determine the image quality of the second image data, for example whether the second image data suffers from noise or errors. In this instance, the decision module 140 may return a decision not to proceed with the method.

If the decision module 140 returns a decision to continue processing the image data, the first image data 136, which in this example is HDR image data, is processed by a gamma correction module 144. The extent of correction applied by the gamma correction module 144 in the example of FIG. 3 is pre-set or pre-determined. However, in other examples, the gamma correction module 144 may receive data, such as metadata, along with the first image data 136, which governs the extent of gamma correction applied by the gamma correction module 144.

The gamma correction module 144 may be used to apply a gamma correction operation to the image to obtain a gamma corrected first version of the image 146. Gamma correction is typically a non-linear operation that may be defined using the following power-law expression:

$$V_{out} = A V_{in}^{\gamma} \quad (1)$$

where $V_{out}$ is an output value, A is a constant, $V_{in}$ is an input value and $\gamma$ is a gamma value. The input and output values are for example luminance or tristimulus values of pixels of the image. Gamma correction can be used for example to represent an image so that an adequate number of bits are allocated to image features that can be distinguished by the human eye, without allocating too many bits to represent image features that the human eye is unable to perceive. For example, gamma correction may be used to provide a representation of the image with a uniform error across the brightness range of the image. This can be used to reduce the appearance of compression artefacts in the image.

In the example of FIG. 3, the gamma correction is applied to the first version of the image after decoding and after the decision module 140. However, in other examples, a gamma correction process may be applied to the first version of the image prior to receipt by a system for implementing the method according to examples. For example, the first version of the image may itself be a gamma corrected version of the image. Thus, the first image data may represent the first version of the image in the same colour space as the second image data represents the second version of the image. For example, the gamma correction process may be used to convert the first image data to the same colour space as the second image data, for example where the first image data is HDR data and the second image data is SDR data. For example, both the first and the second image data may be in a non-linear or gamma-corrected colour space such as the sRGB (standard red green blue) colour space, which uses ITU-R (International Telecommunication Union Radiocommunication Sector) Recommendation BT.709 primaries and a standardized transfer function or gamma curve.

In yet further examples, there may be a colour correction module in addition to or instead of a gamma correction module, or neither colour correction nor gamma correction may be carried out. Such a colour correction module may be used to modify or alter a colour of the second version of the image, for example to widen a colour gamut of the first version image e.g. to match or correspond with a wide colour gamut of a display device for displaying the image, such as an HDR display device. In other examples, the second version of the image may also be gamma corrected and/or colour corrected, similarly to the first version of the image.

In the example of FIG. 3, the first image data 146 representing the first version of the image after gamma correction is processed with the second image data 138 representing the second version of the image by a gain-related data generation module 148. The gain-related data generation module 148 is arranged to calculate gain-related data, A, which in FIG. 3 is the gain itself, although in other examples may be merely based on, related to, or derived from the gain. The gain in this context may be understood to refer to a ratio between pixel intensity or luminance values of the second version of the image and corresponding pixel intensity or luminance values of the first version of the image. The gain may be calculated from average pixel intensity values for the second and first versions of the image over a plurality of pixels, or it may be calculated on a pixel-by-pixel basis. Hence, the gain may be spatially-variant or spatially uniform, for example if the gain is taken as the average intensity for all pixels of the second version of the image divided by the average intensity for all pixels of the first version of the image. Typically, though, the gain is spatially-variant as this allows spatially-variant processing of the first version of the image to generate the second version of the image, such as the application of a spatially-variant tone mapping operation, to be captured. The gain may be considered to be a gain map, in which pixels of the image have a corresponding gain value of the gain map. The gain map may be a spatially-variant gain map.

The gain-related data 150 is received by an effective gain-related data generation module 152. In FIG. 3, the gain-related data generation module 148 and the effective gain-related data generation module 152 are shown as separate modules. However, in other examples, these modules may be integrated in one module, for example a gain-related data generation module that can perform both these functions.

The effective gain-related data generation module 152 is operable to calculate effective gain-related data 154 from the gain-related data 150 and a gain-related control parameter 156. The gain-related control parameter 156 can for example be used to modify or alter the gain-related data 150 to obtain the effective gain-related data 154. This can provide for user interactivity. For example, a user can vary the effective gain-related data 154 by varying the gain-related control parameter 156. This variation may be possible where the gain-related control parameter 156 is received via a user interface (not shown in FIG. 3). For example, a user may be able to interact with a computing system hosting or coupled to the user interface, for use in displaying the image represented by the image data. The user may be able to control the value of the gain-related control parameter 156 in various different ways. For example, the user may be able to provide input to the computing system via any suitable software or hardware such as a touchscreen, a mouse, a keyboard, an image capture device or a joystick. If the computing system includes a smartphone with a touchscreen or touch sensitive display, the user may for example be able to input a gesture on the touch sensitive display to control the value of the gain-related control parameter 156. For example, the user interface may include a slider, a position of which can be controlled by the user to control the value of the gain-related control parameter 156.

The user interface used to receive the gain-related control parameter 156 may be displayed in dependence on the image feature data 142. For example, if the image feature data 142 indicates that the image is unsuitable for further processing, for example if it is low quality or suffers from significant noise or errors, then the user interface for controlling the gain-related control parameter 156 may not be displayed. Conversely, if the image feature data 142 is indicative that the image is suitable for further processing, the user interface may be displayed to provide for user interactivity with the image.

In examples such as FIG. 3, the effective gain-related data, A*, depends on the gain-related data, A, in accordance with:

$$A^* = A\alpha + (1-\alpha)$$

where $\alpha$ is the gain-related control parameter. With this formula, the effective gain-related data, A*, can be varied between 1 and A by varying $\alpha$ between 0 and 1 respectively. In other examples, the gain-related control parameter may take other values, such as values higher than 1. Furthermore, in examples, the effective gain-related data and the gain-related data may be related via a different formula than that given above.

The effective gain-related data 154 of FIG. 3 is received by an output image data generation module 158. The output image data generation module 158 is arranged to apply the effective gain-related data 154 to the image data, in this example to the first image data representing the first version of the image, which is HDR image data, to generate output image data 160 representing an output version of the image. With the gain-related data, A, in this example corresponding to a ratio between SDR and HDR versions of the image (the second and first versions of the image, respectively), when $\alpha$ is 0 and A* is 1, the HDR version of the image will be displayed (based on a multiplication of A* with the HDR version of the image). Similarly, when $\alpha$ is 1 and A* is equal to A, the SDR version of the image will be displayed. In this way, in the method according to examples such as that of FIG. 3, the effective gain-related data 154 is usable to vary the output version of the image between the first version of the image and the second version of the image, in dependence on the gain-related control parameter 156. For example, the first (HDR) version of the image may be displayed in dark viewing conditions. However, in light viewing conditions, there may be reflections of ambient light from the display screen (sometimes referred to as "screen glare") which may reduce the display quality of the HDR version of the image. In these conditions, the user may wish to include a greater relative contribution from the SDR version of the image, to compensate for these reflections.

Figure 4:
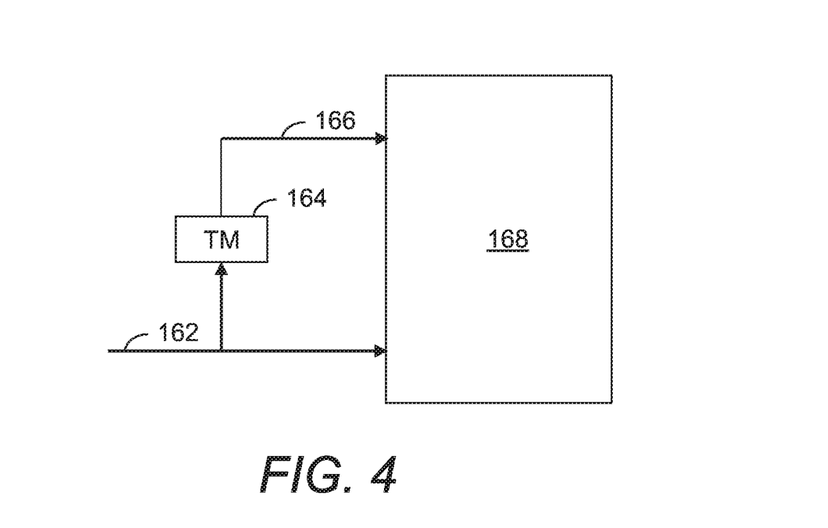
FIG. 4 is a schematic diagram showing an example of image processing applied to second image data to obtain first image data.

FIG. 4 is a schematic diagram showing an example of image processing applied to first image data to obtain second image data. In FIG. 4, first image data 162 representing a first version of the image is received by a tone mapping module 164. The tone mapping module 164 is arranged to apply a spatially-variant tone mapping operation to the first version of the image to obtain a second version of the image represented by second image data 166.

The tone mapping operation in examples aims to enhance detail or contrast in the image, while still ensuring the image appears relatively "natural" to an observer. To do this, the tone mapping may be asymmetric in the brightness domain, such that a greater amount of tone mapping is applied to dark regions of the image than relatively bright regions, for example by altering an intensity value of relatively dark portions of the image to a greater extent than relatively bright portions. This mimics the behavior of the human eye, which has a relatively high dynamic range, and which is capable of seeing detail in even relatively dark regions of an image. The tone mapping operation in this example is therefore spatially-variant, for example spatially non-uniform, with a greater amount of tone mapping applied to certain spatial regions of the image compared with other spatial regions. The tone mapping may be continuous and smoothly-varying in both spatial and luminance dimensions. The intensity range of pixels corresponding with detail to preserve in the image in dark and/or light areas may therefore be increased and the intensity range of other areas of the image may be decreased. The tone mapping may therefore involve adjusting the dynamic range of the image, which in examples is the ratio between intensities of the brightest and darkest parts of the image. Adjusting the dynamic range in this way typically enhances detail in dark and/or light areas of the image and reduces detail in mid-tone areas so as to render visible detail that would otherwise be lost in bright or shaded areas of the image while still maintaining a natural look of the image to the observer. Various different tone mapping algorithms may be used for the tone mapping operation. For example, a suitable algorithm is the Orthogonal Retina-Morphic Image Transform (ORMIT) algorithm.

The dynamic range may be compressed or expanded by the tone mapping operation. For example, the tone mapping operation may apply a dynamic range compression to enhance detail in dark regions of the image. Dynamic range compression can also or alternatively be used to reduce the dynamic range of the image to match or be closer to a dynamic range displayable by a display device coupled to the computing device, for example. Images captured using a camera can have a high dynamic range of for example up to around 4000:1. In contrast, the dynamic range of typical display devices may be much lower than this, for example around 50:1. Dynamic range compression can therefore be applied to reduce a dynamic range of input image data, such as the second decoded image data, representing a high dynamic range image to match a lower dynamic range of a display device for displaying the image.

In this example, the dynamic range of the first version of the image, which is an HDR image, is reduced to generate the second version of the image, which is an SDR image that is for example displayable on an SDR display device.

There may be considered to be two types of tone mapping, each of which may be used to generate an SDR image from an HDR image. A first type of tone mapping, a so-called "low quality" tone mapping operation, aims merely to compress or reduce the dynamic range of the image for display on an SDR display. The image quality obtained using this low-quality tone mapping operation may be relatively low. For example, the image may appear flat and unnatural to a viewer. In contrast, a second type of tone mapping, a so-called "high quality" tone mapping operation, aims to reduce the dynamic range as well as improving the display quality of the image. In this way, the SDR image produced by the second type of tone mapping may appear relatively natural to an observer and with a higher perceived quality than with the first type of tone mapping.

Typically, for the tone mapping operation to be suitable for the method according to examples to be applied to the first and second image data generated, it is desirable for the tone mapping operation to be of the second type, i.e. "high quality". Otherwise, the second version of the image generated by the tone mapping operation, and hence the output version of the image generated based on the second image data representing the second version of the image, may be relatively low quality and unsuitable for display. The image quality obtainable with a particular tone mapping algorithm will depend on the nature of the algorithm itself, as the skilled person will appreciate.

An amount of tone mapping applied by the tone mapping operation may depend on a strength parameter. The amount of tone mapping may correspond with the extent or magnitude of alteration of the intensity value of pixels in the image by the tone mapping operation, for example to adjust the dynamic range or enhance the image detail as explained above. In this example, the strength parameter for the tone mapping operation applied by the tone mapping module 164 is a default value. However, in other examples, the strength parameter may depend on various parameters such as a user preference, a display property of a display device configured to display an output image based on the second tone mapped image data; an ambient light level; or an application property of an application for use in displaying the output image, such as a browser. Where the tone mapping operation involves the use of the ORMIT algorithm, the strength parameter may correspond with the ORMIT alpha parameter, a.

In the example of FIG. 4, the first image data 162 and the second image data 166 are input to an encoder module 168. The encoder module 168 encodes the first image data 162 and the second image data 166 to generate encoded image data (not shown), for more efficient storage and transfer. The encoded image data can then be decoded, for example by a decoder such as the decoder 130 of FIG. 3. If the encoder module 168 is, for example, a JPEG XT encoder, the encoding process may involve encoding the second version of the image and a residual or difference between the first version of the image represented by the first image data 162 and the second version of the image represented by the second image data 166 rather than the first version of the image itself. For example, the output of such a JPEG XT encoder may be a base layer corresponding to the second image data 166 representing a SDR (first) version of the image and a residual or extension layer corresponding to the difference between the SDR and HDR (first and second) versions of the image.

Figure 5:
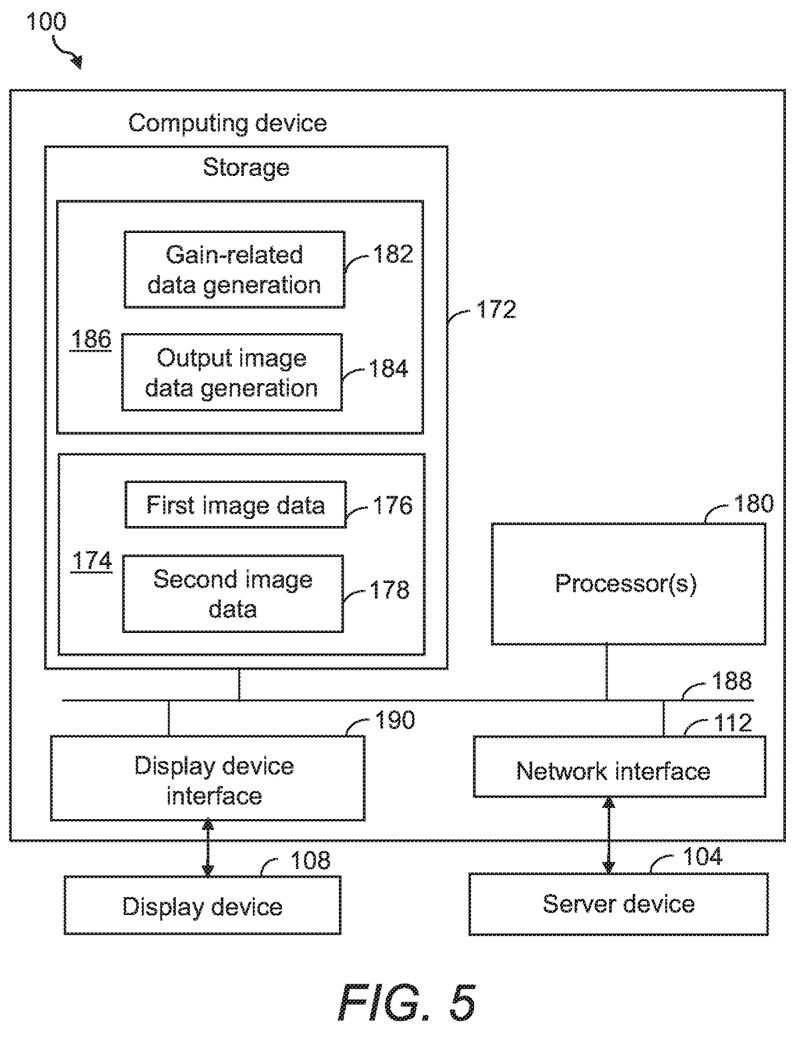
FIG. 5 is a schematic diagram showing an example of internal components of the computing device of FIG. 1.

An overview of examples of internal components of the example computing device 100 of FIG. 1 for use with the method of processing an image according to the examples described herein is provided with reference to FIG. 5. The computing device 100 of FIG. 5 includes a network interface 112 to retrieve image data from a server device 104. The network interface 112 of the computing device 100 may include software and/or hardware components, such as a virtual network interface, an Ethernet port, a software driver and/or communications stack interacting with network hardware.

Storage 172 of the computing device 100 in the example of FIG. 5 stores image data 174 received at the network interface 112. The image data 174 in this example includes first image data 176 representing a first version of an image and second image data 178 representing a second version of an image.

The storage 172 may include at least one of volatile memory, such as a Random Access Memory (RAM) and non-volatile memory, such as Read Only Memory (ROM) or a solid state drive (SSD) such as Flash memory. The storage 172 in examples may include further storage devices, for example magnetic, optical or tape media, compact disc (CD), digital versatile disc (DVD) or other data storage media. The storage 172 may be removable or non-removable from the computing device 100.

At least one processor 180 is communicatively coupled to the storage 172 in the computing device 100 of FIG. 5. The at least one processor 180 in the example of FIG. 5 may include a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 180 may also be or include at least one graphics processing unit (GPU) such as an NVIDIA® GeForce® GTX 980, available from NVIDIA®, 2701 San Tomas Expressway, Santa Clara, Calif. 95050, USA, although other processors are possible. For example, in one case the computing device may comprise a thin terminal with graphics processing capabilities; in other cases the computing device may comprise a computing device comprising at least one central processing unit (CPU) and at least one graphics processing unit.

The storage 172 in the example of FIG. 5 includes computer program instructions configured to, when processed by the at least one processor 180, implement a gain-related data generation module 182 and an output image data generation module 184. The gain-related data generation module 182 of FIG. 5 may be arranged to perform the functions of the gain-related data generation module 148 and the effective gain-related data generation module 152 of FIG. 3. The output image data generation module 184 of FIG. 5 may also be similar to the output image data generation module of FIG. 3. The computer program instructions may be stored in an accessible non-transitory computer-readable medium and loaded into memory, for example the storage 172, to implement these modules.

In the example of FIG. 5, the storage 172 further includes a decoder module 186, which includes the gain-related data generation module 182 and the output image data generation module 184, although in other examples such a decoder module 186 may not include one or both of these other modules. The decoder module 186 may otherwise be similar to the decoder 130 of FIG. 3, and may be operable to receive encoded image data and decoded the encoded image data to generate decoded image data including the first image data, as first decoded image data, and the second image data, as second decoded image data.

The components of the computing device 100 in the example of FIG. 5 are interconnected using a systems bus 188. This allows data to be transferred between the various components. For example, the output image data generated by the method according to examples can be stored in the storage 172 and subsequently transmitted via the systems bus 188 from the storage 172 to a display device interface 190 for transfer to a display device 108 for display. The display device interface 190 may include a display port and/or an internal electronics interface, e.g. where the display device 108 is part of the computing device 100 such as a display screen of a smartphone. Therefore, when instructed by the at least one processor 180 via the display device interface 190, the display device 108 will display an output version of the image based on the output image data.

The above examples are to be understood as illustrative examples. Further examples are envisaged. For example, the examples given above refer to use of images in the JPEG or JPEG XT formats. However, it is to be appreciated that the method, systems and devices described above may be applied to or used with images stored in various other formats.

The examples described above use software to implement the method according to examples. However, in other examples, the method may be implemented using solely hardware or using a combination of hardware and software.

For example, in FIG. 3, the generating the gain-related data and the generating the effective gain-related data are performed by components of the system other than the decoder 130. However, in other examples, either or both of the generating the gain-related data and the generating the effective gain-related data may be performed by a decoder for decoding encoded image data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

Further examples are described in accordance with the following numbered clauses:

1. A method comprising: receiving image data representing an image, the image data comprising: first image data representing a first version of the image; and second image data representing a second version of the image; generating gain-related data based on the first image data and the second image data; generating effective gain-related data at least based on the gain-related data and a gain-related control parameter; and applying the effective gain-related data to the image data to generate output image data representing an output version of the image.

2. The method according to clause 1, comprising receiving image feature data representative of one or more features of the image and performing the generating the gain-related data, the generating the effective gain-related data and the applying the effective gain-related data in dependence on the image feature data.

3. The method according to clause 2, wherein the one or more features include a feature indicative of a characteristic of image processing that has been applied to the first image data to obtain the second image data.

4. The method according to clause 3, wherein the feature indicative of the characteristic of the image processing is indicative that a spatially-variant tone mapping operation of a predetermined quality has been applied to the first image data to obtain the second image data.

5. The method according to any one of clauses 2 to 4, wherein the one or more features include a feature indicative that the second version of the image comprises a level of noise above a predetermined noise threshold.

6. The method according to any one of clauses 2 to 5, wherein the image feature data is metadata of the image data.

7. The method according to any one of clauses 2 to 5, comprising deriving the image feature data from the image data.

8. The method according to any one of clauses 1 to 7, wherein the gain-related control parameter is received via a user interface.

9. The method according to clause 8, when dependent on any one of clauses 2 to 7, comprising displaying the user interface in dependence on the image feature data.

10. The method according to any one of clauses 1 to 9, wherein the effective gain-related data is usable to vary the output version of the image between the first version of the image and the second version of the image, in dependence on the gain-related control parameter.

11. The method according to any one of clauses 1 to 10, wherein the effective gain-related data, A*, depends on the gain-related data, A, in accordance with: $A^* = A\alpha + (1-\alpha)$ where $\alpha$ is the gain-related control parameter.

12. The method according to any one of clauses 1 to 11, wherein the second version of the image corresponds to the first version of the image after application of a spatially-variant tone mapping operation to the first version of the image.

13. The method according to any one of clauses 1 to 12, wherein the first version of the image is a high dynamic range version of the image and the second version of the image is a standard dynamic range version of the image.

14. The method according to any one of clauses 1 to 13, wherein the gain-related data represents a gain map based on a ratio between pixel intensity values of the second version of the image and corresponding pixel intensity values of the first version of the image.

15. The method according to clause 14, where the gain map is a spatially-variant gain map.

16. The method according to any one of clauses 1 to 15, wherein the image data is decoded image data, the first image data is first decoded image data and the second image data is second decoded image data, the method further comprising: receiving encoded image data; and decoding the encoded image data to generate the decoded image data comprising the first decoded image data and the second decoded image data.

17. The method according to clause 16, wherein the decoding the encoded image data and the generating the gain-related data are performed by a decoder capable of decoding the encoded image data.

18. The method according to clause 17, wherein the generating the effective gain-related data is performed by the decoder.

19. The method according to any one of clauses 1 to 18, wherein the image data is in a more than 8-bit JPEG (Joint Photographic Experts Group) XT format.

20. The method according to any one of clauses 1 to 19, wherein the first version of the image is a gamma corrected version of the image.

21. The method according to any one of clauses 1 to 20, wherein the first image data represents the first version of the image in the same color space as the second image data represents the second version of the image.

22. A computing device comprising: storage for storing image data representing an image, the image data comprising: first image data representing a first version of the image; and second image data representing a second version of the image; at least one processor communicatively coupled to the storage; a gain-related data generation module operable to: generate gain-related data based on the first image data and the second image data; and generate effective gain-related data at least based on the gain-related data and a gain-related control parameter; and an output image data generation module operable to: apply the effective gain-related data to the image data to generate output image data representing an output version of the image.

23. The computing device of clause 22, comprising a decoder module, the decoder module comprising the gain-related data generation module.

24. The computing device of clause 23, the decoder module further comprising the output image data generation module.

25. The computing device of clause 23 or clause 24, wherein the image data is decoded image data, the first image data is first decoded image data and the second image data is second decoded image data, and the decoder module is operable to: receive encoded image data; and decode the encoded image data to generate the decoded image data comprising the first decoded image data and the second decoded image data.

What is claimed is:

1. A method comprising:
receiving image data representing an image, the image data comprising:
first image data representing a first version of the image; and
second image data representing a second version of the image, the second image data obtained by processing the first image data;
generating gain-related data based on the first image data and the second image data, wherein the gain-related data represents a gain representative of a ratio between pixel intensity values of the second version of the image and corresponding pixel intensity values of the first version of the image;
modifying the gain using a gain-related control parameter to generate effective gain-related data representing a modified gain; and
applying the effective gain-related data to the image data to generate output image data representing an output version of the image.

2. The method according to claim 1, comprising receiving image feature data representative of one or more features of the image and performing the generating the gain-related data, the generating the effective gain-related data, and the applying the effective gain-related data in dependence on the image feature data.

3. The method according to claim 2, wherein the one or more features include a feature indicative of a characteristic of image processing that has been applied to the first image data to obtain the second image data.

4. The method according to claim 3, wherein the feature indicative of the characteristic of the image processing is indicative that a spatially-variant tone mapping operation of a predetermined quality has been applied to the first image data to obtain the second image data.

5. The method according to claim 2, wherein the one or more features include a feature indicative that the second version of the image comprises a level of noise above a predetermined noise threshold.

6. The method according to claim 1, wherein the gain-related control parameter is received via a user interface.

7. The method according to claim 1, wherein the effective gain-related data is usable to vary the output version of the image between the first version of the image and the second version of the image, in dependence on the gain-related control parameter.

8. The method according to claim 1, wherein the effective gain-related data, A*, depends on the gain-related data, A, in accordance with:

$A^* = A\alpha + (1-\alpha)$ where α is the gain-related control parameter.

9. The method according to claim 1, wherein the second version of the image corresponds to the first version of the image after application of a spatially-variant tone mapping operation to the first version of the image.

10. The method according to claim 1, wherein the first version of the image is a high dynamic range version of the image and the second version of the image is a standard dynamic range version of the image.

11. The method according to claim 1, wherein the gain-related data represents a gain map based on a ratio between pixel intensity values of the second version of the image and corresponding pixel intensity values of the first version of the image.

12. The method according to claim 11, where the gain map is a spatially-variant gain map.

13. The method according to claim 1, wherein the image data is decoded image data, the first image data is first decoded image data and the second image data is second decoded image data, the method further comprising:
receiving encoded image data; and
decoding the encoded image data to generate the decoded image data comprising the first decoded image data and the second decoded image data.

14. The method according to claim 1, wherein the image data is in a more than 8-bit JPEG (Joint Photographic Experts Group) XT format.

15. The method according to claim 1, wherein the first version of the image is a gamma corrected version of the image.

16. The method according to claim 1, wherein the first image data represents the first version of the image in the same color space as the second image data represents the second version of the image.

17. A computing device comprising:
storage for storing image data representing an image, the image data comprising:
first image data representing a first version of the image; and
second image data representing a second version of the image, the second image data obtained by processing the first image data;
at least one processor communicatively coupled to the storage;
a gain-related data generation module operable to:
generate gain-related data based on the first image data and the second image data, wherein the gain-related data represents a gain representative of a ratio between pixel intensity values of the second version of the image and corresponding pixel intensity values of the first version of the image; and
modify the gain using a gain-related control parameter to generate effective gain-related data representing a modified gain; and
an output image data generation module operable to:
apply the effective gain-related data to the image data to generate output image data representing an output version of the image.

18. The computing device of claim 17, comprising a decoder module, the decoder module comprising the gain-related data generation module.

19. The computing device of claim 18, the decoder module further comprising the output image data generation module.

20. The computing device of claim 18, wherein the image data is decoded image data, the first image data is first decoded image data and the second image data is second decoded image data, and
the decoder module is operable to:
receive encoded image data; and
decode the encoded image data to generate the decoded image data comprising the first decoded image data and the second decoded image data.

21. A method comprising:
receiving image data representing an image, the image data comprising:
first image data representing a first version of the image; and
second image data representing a second version of the image;
generating gain-related data based on the first image data and the second image data, wherein the gain-related data represents a gain representative of a ratio between pixel intensity values of the second version of the image and corresponding pixel intensity values of the first version of the image;
receiving a gain-related control parameter via an input;
modifying the gain using the gain-related control parameter to generate effective gain-related data representing a modified gain; and
applying the effective gain-related data to the image data to generate output image data representing an output version of the image.

* * * * *